(12) United States Patent
Jones

(10) Patent No.: US 6,712,416 B1
(45) Date of Patent: Mar. 30, 2004

(54) CONVERTIBLE LIFTGATE, RAMP AND WORK PLATFORM COMBINATION

(76) Inventor: Dan Jones, 3239 FM 217, Mosheim, TX (US) 76689

( * ) Notice: Subject to any disclaimer, the term of this patent is extended or adjusted under 35 U.S.C. 154(b) by 0 days.

(21) Appl. No.: 10/348,354

(22) Filed: Jan. 21, 2003

(51) Int. Cl.[7] .............................................. B62D 25/24
(52) U.S. Cl. ........................ 296/61; 296/51; 296/57.1
(58) Field of Search ..................... 296/61, 50, 57.1

(56) References Cited

U.S. PATENT DOCUMENTS

| | | | | |
|---|---|---|---|---|
| 4,813,842 A | * | 3/1989 | Morton ...................... | 296/57.1 |
| 5,169,202 A | * | 12/1992 | Cupp et al. ................ | 296/57.1 |
| 5,518,158 A | * | 5/1996 | Matlack ...................... | 296/51 |
| 5,575,521 A | * | 11/1996 | Speis .......................... | 296/57.1 |
| 5,641,262 A | * | 6/1997 | Dunlop et al. ............. | 296/57.1 |
| 5,649,731 A | * | 7/1997 | Tognetti ..................... | 296/57.1 |
| 5,823,595 A | * | 10/1998 | Tronco ....................... | 296/57.1 |
| 6,193,294 B1 | * | 2/2001 | Disner et al. .............. | 296/57.1 |
| 6,227,594 B1 | * | 5/2001 | Pommeret ................... | 296/57.1 |

* cited by examiner

*Primary Examiner*—D. Glenn Dayoan
*Assistant Examiner*—Lori L Coletta
(74) *Attorney, Agent, or Firm*—David G. Henry

(57) ABSTRACT

A convertible liftgate assembly for use with pickup trucks. The assembly includes one or more platform components which may serve as sturdy, flat panels for service as ramps, and include legs for use also as work platforms or scaffolds. All components of the liftgate assembly can be secured in a nested configuration resembling a conventional pickup truck liftgate, with each platform component being removable for service as a ramp or work platform.

1 Claim, 2 Drawing Sheets

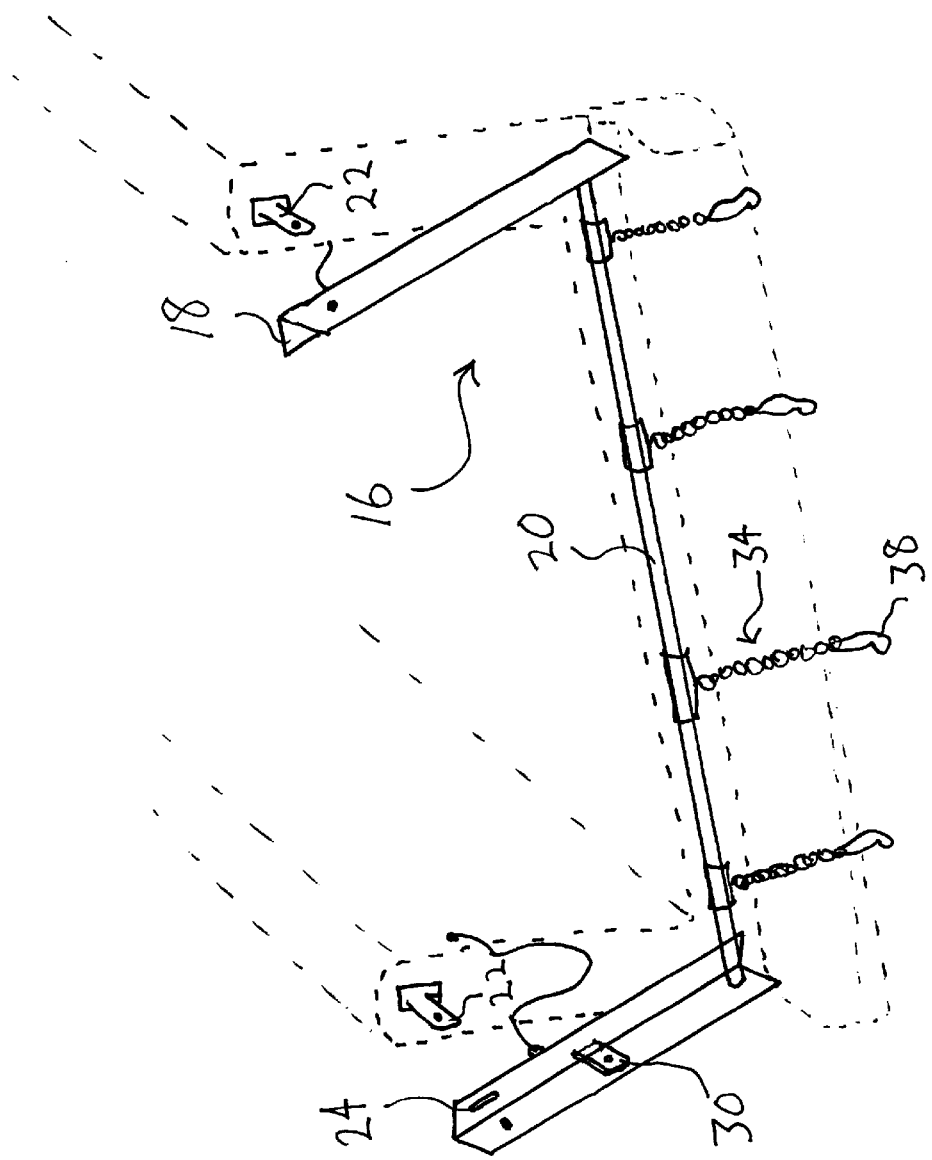

CONVERTIBLE LIFTGATE, RAMP AND WORK PLATFORM COMBINATION

BACKGROUND OF THE INVENTION

1. Field of the Invention

The present invention relates to vehicle accessories and multi-purpose tools.

2. Background Information

Pickup trucks are clearly designed, first and foremost, for work. Despite the trendiness of owning a pickup truck, even if one never leaves the city, countless people use their pickup trucks as they were intended—to move things to and from work sites and, in many cases, to carry out work itself (such as by hauling, pulling, and otherwise moving or supporting people and equipment.

As will shortly become readily apparent as relevant to the present invention, one fact relating to pickup trucks is that, for practical purposes, the bed can really never be too big. One can always use a few extra square feet, and anything that consumes bed space diminishes the utility of the pickup truck.

Related to the useful space concerns of pickup truck users is the fact that ramps and/or work platforms (tables, saw horses, etc.) are often involved in carrying out the work of pickup truck owners. If these things are carried in the truck bed (as they presently are), important (and limited) bed space is consumed thereby, in some cases, requiring multiple trips to get everything needed from one place to another.

Clearly, there are ways to carry things (including ramps and work platforms) which either will not fit within a pickup truck bed, or which would best not consume bed space. These options (trailers, side-mount hooks, or overhead frames for supporting items above the bed) are, however, not particularly pleasing from an aesthetic standpoint and, in the case of trailers, not always present when needed. Modification of a pickup truck to include side hooks and overhead frames tend to diminish the re-sale value of the vehicle.

It would be of considerable interest and benefit to working pickup truck owners to have available some system or apparatus which, while providing the functionality of ramps and a working platform, essentially consumes no bed space, yet remains with the pickup truck and ready for use at all times.

SUMMARY OF THE INVENTION

It is an object of the present invention to provide an improved lift bed for pickup trucks.

It is another object of the present invention to provide an improved lift bed for use with pickup trucks, which improved lift bed serves multiple purposes, in addition to simply enclosing the rearward bed perimeter.

It is another object of the present invention to provide an improved lift bed for use with pickup trucks, which improved lift bed is convertible between alternatively useful configurations.

It is another object of the present invention to provide an improved lift bed for use with pickup trucks, which improved lift bed is convertible between configurations for service as a lift bed, one or more ramps, and a working platform (table or scaffold).

In satisfaction of these and related objects, the present invention provides a pickup truck lift bed assembly which is convertible between a first configuration for service, essentially, as a conventional lift bed (without consuming any material amount of bed space), a second configuration where all or a portion of the assembly serves as one or two ramps for rolling items in and out of the pickup truck bed, and a third configuration where working platforms are provided.

By providing a lift bed assembly which such capabilities, one need not consume valuable pickup truck bed space with ramps or working platforms, yet will always have these things available when needed. Furthermore, the assembly of the present invention is very easily secured to the pickup truck in a manner which, as compared to ramps and working platforms simply residing in the pickup bed between uses, is much less likely to be stolen.

BRIEF DESCRIPTION OF THE DRAWINGS

FIG. 2 is a perspective view of the liftgate support assembly portion of the present invention, with the two platform components thereof removed for visualization of the liftgate support assembly.

DETAILED DESCRIPTION OF THE PREFERRED EMBODIMENT

Figure 1:
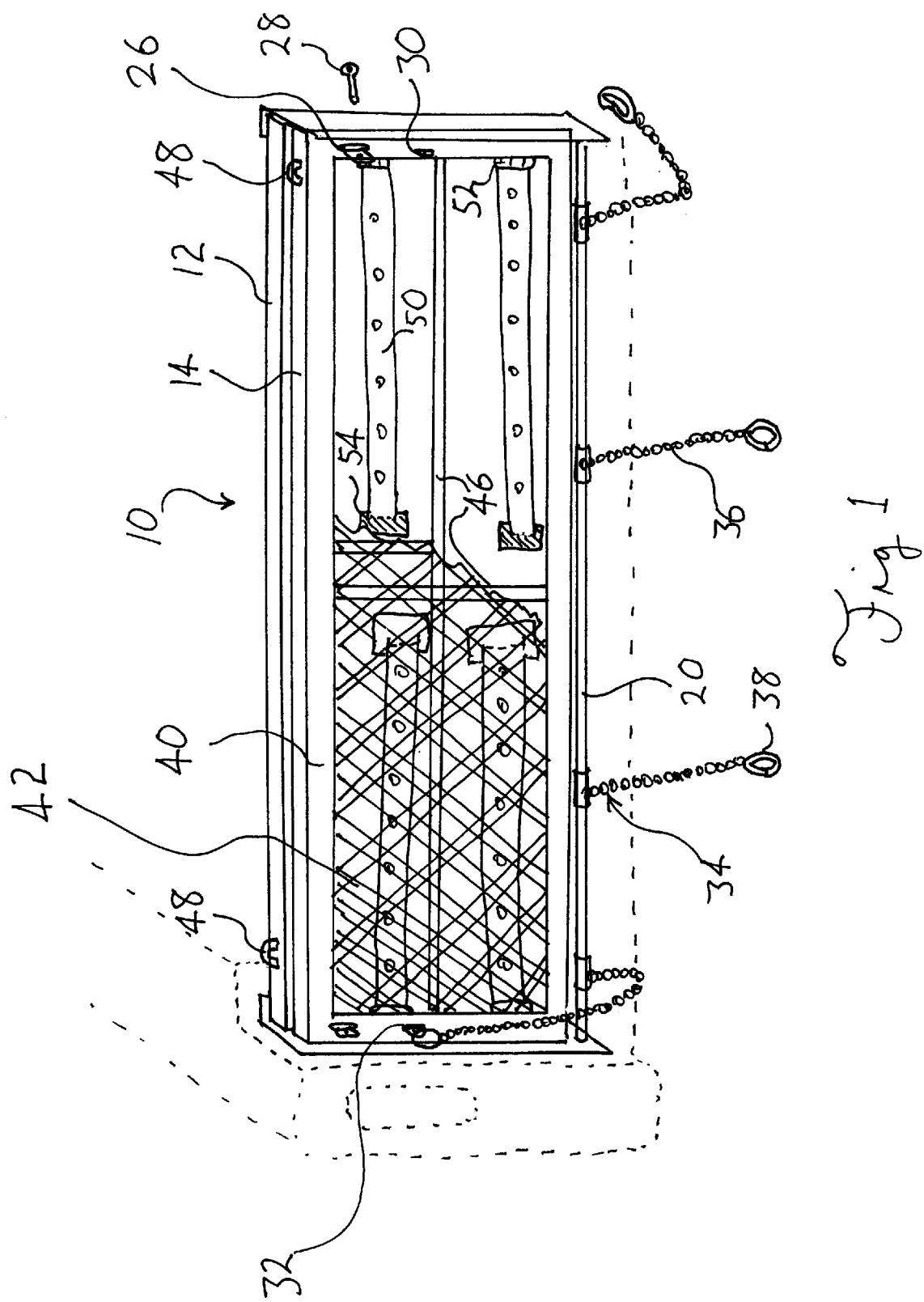
FIG. 1 is a perspective view of a liftgate assembly of the present invention shown installed on a conventional pickup truck (partially depicted in dashed line). A portion of the working surface (expanded steel mesh) is removed for showing underlying legs of the outermost platform component.

Referring to FIG. 1, the liftgate assembly of the present invention is identified generally by the reference numeral 10. Assembly 10 is comprised of two platform components 12 and 14 which, when assembly 10 is in position on a pickup truck as a conventional liftgate, are in a stacked configuration and are secured in position as will be described hereafter.

Referring in combination to FIGS. 1 and 2, platform components 12 and 14 are supported, when in the liftgate configuration on a truck, by liftgate support assembly 16. Liftgate support assembly 16 is rotatably attached to the pickup truck in a conventional manner, such that liftgate support assembly 16 pivotally raises and lowers as any conventional liftgate (whether or not platform components 12 and 14 are positioned in liftgate support assembly 16 as in FIG. 1).

Liftgate support assembly 16 includes two side abutment members 18 and a connecting rod 20 spanning therebetween. It is connection rod 20 which is attached to a pickup truck for rotatably supporting the entire assembly 16.

Although the arrangement for securing can vary considerably, one embodiment of the present invention involves securing the liftgate assembly 10 in the upright, liftgate orientation (FIG. 1) through interaction of a locking tab 22 and a first locking tab opening 24 (preferably on each end of liftgate assembly 10). In at least some embodiments, platform components 12 and 14 each include second locking tab openings 26 whereby locking tab 22 extends through all major components of the liftgate assembly 10 and are secured in the upright position through use of a cotter key 28 (or alternative clip, nut-bolt combination, or equivalent alternative) as passes through the hole in locking tab 22.

Each side abutment member 18 includes, in the preferred embodiment, a nesting tab 30, and each of platform components 12 and 14 include nesting tab openings 32. By contrast with the purpose and function of locking tab 22 and locking tab openings 24 and 26 which serve to hold liftgate assembly 10 in the upright position vis a vis the truck in which assembly 10 is installed, nesting tab 30 and nesting tab openings 32 serve to maintain platform components 12 and 14 in a nested, or stacked position and securely attached to liftgate support assembly 16 when assembly 10 is used as only a conventional liftgate.

Again, a variety of means may be used, but some form of pin, clip, or the like is used to secure platform components 12 and/or 14 in position on liftgate support assembly 16 through passage through holes in nesting tabs 30 when platform components 12 and 14 are positioned thereon with nesting tab 30 extending through nesting tab openings 32.

At least chain support assemblies 34 are slidably positioned on connecting rod 20, and to each one is attached a chain 36 and, in the preferred embodiment, a spring-loaded clip 38. The primary purpose of chain support assemblies 34 are to hold platform components 12 and/or 14 in positioned when they are being used as a ramp (to be discussed hereafter). However, clips 38 of two of the four chain support assemblies 34 can be used to serve the pin or clip function in relation to nesting tab 30 as discussed above and as shown in FIG. 1 on the left side.

Referring in combination to FIGS. 1 and 2, each platform components 12 and 14 is an elongate structure with a heavy duty support frame 40 and a steel mesh (expanded steel) work surface member 42 attached thereto. Support frame 40 includes an peripheral outer frame 44 and interior support members 46 (a very simply support member arrangement is depicted for simplicity of depiction, but the preferred embodiment will include additional support members 46 to insure adequate strength for service of platform components 12 and 14 as ramps for heavy wheeled vehicles and equipment.

Ramp eyes 48 are positioned near a first end and on either side of each of platform components 12 and 14, and are designed to receive therethrough clips 38 for supporting platform components 12 and 14 in a ramp configuration. In this configuration, the first end of each platform components 12 and 14 is supported and maintained near the rearward edge of the associated pickup truck bed (usually supported, in part, by an underlying bumper [not shown]), while the second end of platform components 12 and 14 rest on the ground. In this configuration, platform components 12 and 14 can readily serve as ramps for rolling vehicles or equipment to or from the pickup truck bed.

Also included in each platform component 12 and 14 are, in the preferred embodiment, four hinged legs 50. Each leg 50 is attached, via hinges 52, to the outer frame 44 of each platform component 12 and 14. Legs 50 are, in the preferred embodiment, designed to swing out over an approximately 110 degree arc to serve as slightly outwardly radiating, stable supports for platform components 12 and 14 when serving as a work platform, scaffold, or the like. Range of motion of legs 50 may be stopped in the desired extended position through use of limited-travel hinges which will allow rotate only to a desired degree and position, through use of conventional, card table-like leg braces, or through alternative means as would be apparent to persons skilled in the art.

Legs 50 of the preferred embodiment include hinged feet plates 54 which provide additional stability and resistance to penetrating soft soil and becoming dangerously un-level (for example, when used as a scaffold).

As should be apparent from the above discussions and descriptions, any embodiment of the present invention will provide substantial utility to its user. The same apparatus serves as a pickup truck liftgate, one or two ramps, and one or two working platforms or scaffolds, all while consuming little or no truck bed space.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. Such modifications may involve, for example, the inclusion of fewer or more than two platform components, a working surfaces fabricated of other than expanded steel mesh, telescopic legs differing securement schemes for maintaining the liftgate assembly in its upright position and/or maintaining the platform components in nested, stacked position vis a vis the liftgate support assembly, a differing manner of attachement between the liftgate assembly and the recipient truck, and so on. It is, therefore, contemplated that the appended claims will cover such modifications that fall within the scope of the invention.

I claim:

1. A convertible liftgate, ramp and work platform assembly comprising:

a liftgate support assembly and a platform component;

said platform component having a support frame, a work surface member attached to a first face of said support frame, and a plurality of legs each rotatably attached to said support frame and configured for reversibly moving between a retracted position, wherein said legs are substantially nested within the bounds of said support frame, and an extended position wherein said legs extend from a second face of said support frame and configure said platform component as a legged work platform;

said liftgate support assembly and said platform component having complimentary components of nesting securement means for reversibly securing said platform components to said liftgate support assembly, for converting said liftgate support assembly and said platform component between a liftgate configuration, whereby said liftgate support assembly and said platform component are secured to one another and in combination serve as a liftgate of a pickup truck bed, and a detached configuration whereby said platform components are separated from said liftgate support assembly for use independently of said pickup truck bed.

* * * * *